United States Patent [19]

Cowit

[11] 4,037,192

[45] July 19, 1977

[54] FLAT TIRE INDICATING DEVICE

[75] Inventor: Burt L. Cowit, Morganville, N.J.

[73] Assignee: The Raymond Lee Organization, Inc., New York, N.Y. ; a part interest

[21] Appl. No.: 706,900

[22] Filed: July 19, 1976

[51] Int. Cl.² .............................................. B60C 23/04
[52] U.S. Cl. ..................................... 340/58; 340/224; 200/61.25
[58] Field of Search ............... 340/58, 224; 200/61.22, 200/61.25

[56] References Cited

U.S. PATENT DOCUMENTS

| 3,533,063 | 10/1970 | Garcia | 340/58 |
| 3,713,092 | 1/1973 | Ivenbaum | 340/58 |

Primary Examiner—Alvin H. Waring
Attorney, Agent, or Firm—Daniel Jay Tick

[57] ABSTRACT

An air-operated switch device is provided in a housing having an internally threaded part threadedly coupled to the valve stem of a tire. The switch device is in operative proximity with the valve stem and has an open condition when the tire pressure is above a predetermined air pressure and a closed condition when the tire pressure is reduced to one below a predetermined air pressure. The switch device has a movable electrical contact device controlled in position by the pressure of air in the tire. A circuit electrically connects a battery, an audible alarm device and a radio transmitter in the housing with the switch device in circuit whereby when the switch device is moved to its closed condition the battery actuates the alarm device and the transmitter. A radio receiver receives a signal transmitted by the transmitter thereby indicating that the tire is flat.

1 Claim, 4 Drawing Figures

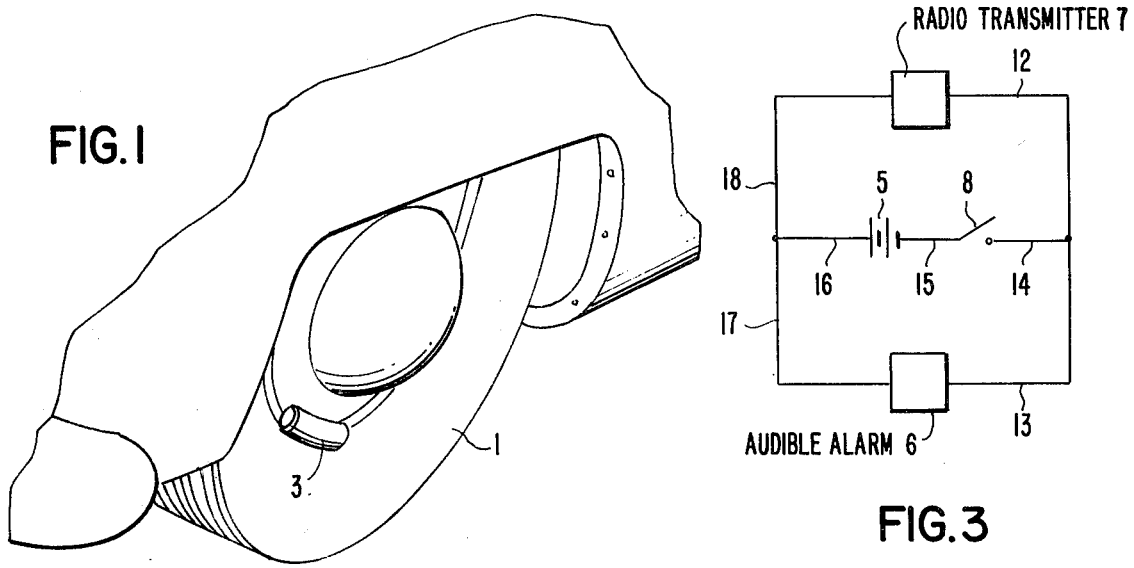
FIG. 1
FIG. 3
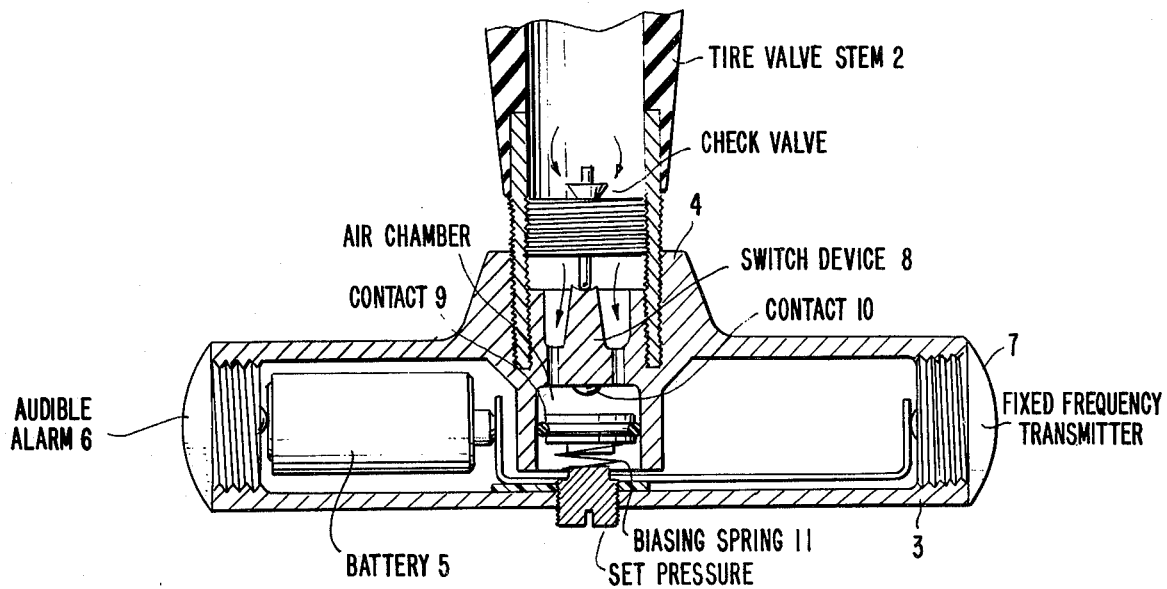
FIG. 2
FIG. 4
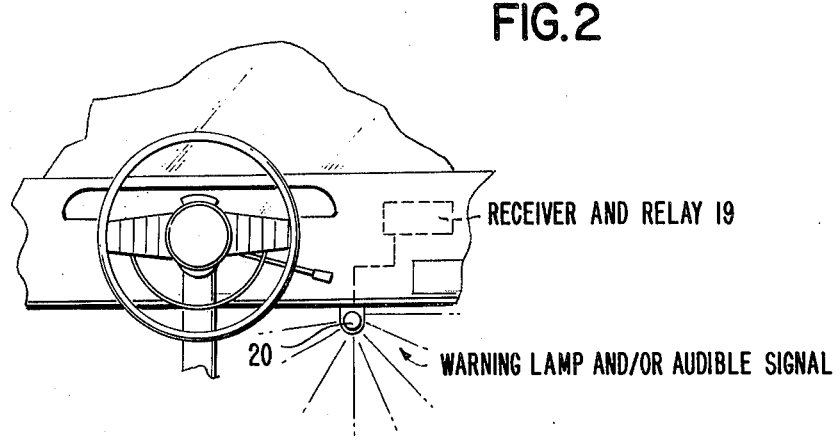

FLAT TIRE INDICATING DEVICE

BACKGROUND OF THE INVENTION

The present invention relates to a flat tire indicating device. More particularly, the invention relates to a flat tire indicating device for indicating when a tire has lost at least a predetermined air pressure, the tire having a tire valve with an externally threaded valve stem.

Objects of the invention are to provide a flat tire indicating device of simple structure, which is inexpensive in manufacture, installed with facility and convenience on new and existing tires of all types, and functions efficiently, effectively and reliably to provide an audible alarm at the tire and an alarm at a distance from the tire, such as, for example, in the cab of a motor vehicle on which the tire is utilized.

BRIEF DESCRIPTION OF THE DRAWINGS:

In order that the invention may be readily carried into effect, it will now be described with reference to the accompanying drawings, wherein:

FIG. 1 is a perspective view of an embodiment of the flat tire indicating device mounted on a tire;

FIG. 2 is a cross-sectional view, on an enlarged scale, of an embodiment of the flat tire indicating device of the invention;

FIG. 3 is a circuit diagram of the flat tire indicating device of the invention; and FIG. 4 is a schematic diagram of the receiver and alarm in the cab of the vehicle utilizing the flat tire indicating device of the invention.

DETAILED DESCRIPTION OF THE INVENTION

The flat tire indicating device of the invention indicates when a tire 1 has lost at least a predetermined air pressure (FIG. 1). The tire has a tire valve with an externally threaded valve stem 2 (FIG. 2).

The flat tire indicating device of the invention comprises a housing 3 (FIGS. 1 and 2) having an internally threaded part 4 threadedly coupled to the valve stem 2 of the tire 1, as shown in FIG. 2.

A battery 5 of any suitable known type is provided in the housing 3.

An audible alarm 6 of any suitable known type is provided in the housing 3. The audible alarm 6 (FIGS. 2 and 3) may comprise, for example, an electric whistle or other electrically operated audible signalling device.

A radio transmitter 7 (FIGS. 2 and 3 ) of any suitable known type is provided in the housing 3. The radio transmitter 7 preferably comprises a fixed frequency transmitter.

In accordance with the invention, an air-operated switch device 8 is provided in the housing 3 in operative proximity with the valve stem 2. The switch device 8 has an open condition, shown in FIG. 2, when the tire pressure is above the predetermined air pressure, since it has a movably mounted electrical contact 9 which is held in open condition, spaced from a fixed contact 10 by the pressure of air in the tire when said pressure is above the predetermined air pressure. When the pressure of air in the tire 1 is reduced to one below the predetermined air pressure, due to a flat anywhere in the tire, such pressure is insufficient to maintain the movable contact 9 in its position shown in FIG. 2, and such contact moves under the force of a biasing spring 11 into electrical contact with the fixed contact 10 of the switch device 8. The switch device 8 is then in closed condition.

As shown in FIG. 3, a circuit 12, 13, 14, 15, 16, 17, 18 electrically connects the battery 5, the alarm device 6, the transmitter 7 and the switch device 8 in circuit whereby when the switch decice is moved to its closed condition, the battery actuates the alarm device and the transmitter. When the alarm device is actuated it sounds an audible alarm at the tire. When the radio transmitter is actuated it transmits a radio signal which is received by a radio receiver 19 (FIG. 4) of any suitable known type positioned in the cab of the vehicle on which the tire is mounted. The receiver 19 indicates, when it receives such signal from the transmitter 7, that the tire is flat. This is accomplished by operating a relay, for example, which, in turn, actuates an audible visual alarm 20 in the cab of the vehicle.

While the invention has been described by means of a specific example and in a specific embodiment, I do not wish to be limited thereto. for obvious modifications will occur to those skilled in the art without departing from the spirit and scope of the invention.

I claim:

1. a flat tire indicating device for indicating when a tire has lost at least a predetermined air pressure, said tire having a rim and a tire valve with an externally threaded valve stem having an axis, said flat tire indicating device comprising
   a substantially elongated housing having an internally threaded part threadedly coupled to the valve stem of a tire, said housing extending substantially perpendicularly to the axis of the valve stem and substantially symmetrical thereto whereby said housing is positioned along the rim of the tire;
   battery means in the housing;
   audible alarm means in the housing;
   radio transmitter means in the housing;
   air-operated switch means in the housing and in operative proximity with the valve stem having an open condition when the tire pressure is above the predetermined air pressure and a closed condition when the tire pressure is reduced to one below the predetermined air pressure, said switch means having movable electrical contact means controlled in position by the pressure of air in the tire and spring biasing means for adjustment to the predetermined air pressure;
   circuit means electrically connecting the battery means, alarm means, transmitter means and switch means in a circuit whereby when the switch means is moved to its closed condition the battery means actuates the alarm means and transmitter means; and
   radio receiver means for receiving a signal transmitted by the transmitter means thereby indicating that the tire is flat.

* * * * *